United States Patent
Chandak et al.

(10) Patent No.: US 12,307,480 B1
(45) Date of Patent: May 20, 2025

(54) SYSTEM AND A METHOD FOR OPTIMIZING ADVERTISEMENT YIELD AND REDUCING ADVERTISEMENT LATENCY

(71) Applicant: Adster Technologies Pvt. Ltd., Bengaluru (IN)

(72) Inventors: Ketan Chandak, Bengaluru (IN); Ranganathan Srinivasan, Bengaluru (IN); Girish Vishwanath Chirravoori, Bengaluru (IN); Shivansh Pandey, Bengaluru (IN); Ashish Kumar, Bengaluru (IN); Rajiv Kumaar, Bengaluru (IN)

(73) Assignee: Adster Technologies Pvt. Ltd., Bengaluru (IN)

( * ) Notice: Subject to any disclaimer, the term of this patent is extended or adjusted under 35 U.S.C. 154(b) by 0 days.

(21) Appl. No.: 18/926,743

(22) Filed: Oct. 25, 2024

(51) Int. Cl.
G06Q 30/00 (2023.01)
G06Q 30/0242 (2023.01)
G06Q 30/0273 (2023.01)

(52) U.S. Cl.
CPC ..... G06Q 30/0244 (2013.01); G06Q 30/0246 (2013.01); G06Q 30/0275 (2013.01)

(58) Field of Classification Search
CPC ........... G06Q 30/0244; G06Q 30/0246; G06Q 30/0275
See application file for complete search history.

(56) References Cited

U.S. PATENT DOCUMENTS

| | | | |
|---|---|---|---|
| 11,080,755 B1 | 8/2021 | Logvinskiy et al. | |
| 2011/0258049 A1 | 10/2011 | Ramer et al. | |
| 2017/0358011 A1* | 12/2017 | Guermas | G06Q 30/0275 |
| 2019/0130460 A1* | 5/2019 | Theodore | G06Q 30/0275 |
| 2020/0013093 A1* | 1/2020 | Brooks | G06Q 30/0275 |
| 2023/0267510 A1* | 8/2023 | Choi | G06F 16/9577 |
| | | | 705/14.71 |

FOREIGN PATENT DOCUMENTS

IN 202341047808 A 8/2024

* cited by examiner

Primary Examiner — Meredith A Long
(74) Attorney, Agent, or Firm — Jason A. Smith; Shumaker, Loop & Kendrick, LLP

(57) ABSTRACT

A system and a method for optimizing advertisement yield and reducing latency. The system receives an ad request and initiates parallel bid requests to a mediation platform, header bidding partners, and ad networks. The system then determines the highest bid from header bidding partners in real-time while simultaneously determining a prioritized list of demand sources from the mediation platform. The highest bid and its associated ad object are cached and submitted to the mediation platform in a single hop. The mediation platform mediates this bid against other sources. The system selects the ad object, for display on a client device, either from the header bidding partner's ad object if the mediation platform doesn't confirm a higher bid, or the mediation platform's ad object if it does. The system utilizes caching, parallel processing, and backfill strategies to reduce latency and optimize ad selection. It can also dynamically adjust backfill ad network positioning based on real-time data.

23 Claims, 3 Drawing Sheets

SYSTEM AND A METHOD FOR OPTIMIZING ADVERTISEMENT YIELD AND REDUCING ADVERTISEMENT LATENCY

PRIORITY INFORMATION

The present application does not claim a priority from any other application.

TECHNICAL FIELD

The present invention relates to digital advertising systems and, more specifically, to systems and methods for optimizing advertisement yield and reducing advertisement latency in real-time bidding environments.

BACKGROUND

In the digital advertising industry, real-time bidding (RTB) has become the standard practice for optimizing ad revenue. Through RTB, advertisers can bid for ad impressions in real time, allowing publishers to maximize the value of their ad inventory. One widely adopted method in RTB is header bidding, where multiple demand partners are allowed to bid simultaneously for ad placements, ensuring greater competition for each impression and potentially higher yields for publishers.

In addition to header bidding, mediation platform, such as Google Ad Manager™ and AdMob™, are used by publishers to manage multiple ad networks. The mediation platform sends a parallel bids to demand partners that are integrated with them. For example, Meta™ PubMatic™, InMobi™ and others are called in parallel and a demand partner that sends the highest bid within the mediation platform wins the bid. Further, the winner platform sends an ad object to an application requesting the advertisement.

Despite these technological advancements, publishers face significant limitations in their ability to fully utilize these tools. Publishers often lack the infrastructure, such as their own ad servers, to manage demand sources effectively. They are restricted by the limitations of third-party platforms, which can create inefficiencies in integrating demand partners. These limitations prevent publishers from gaining the flexibility needed to maximize their ad yields.

However, while both header bidding and mediation platforms offer benefits, the combination of these systems often results in technical inefficiencies, particularly with respect to ad delivery speed.

Furthermore, as the digital advertising ecosystem evolves, major platforms like Google™ and Meta™ continue to introduce changes in response to new regulations and market demands. Publishers must constantly adapt their systems to remain compliant and competitive, creating additional complexity that further slows down the ad delivery process.

Latency becomes a critical issue in digital advertising because ad requests must be processed and ads must be delivered within a very short window of time. When ad requests are delayed due to slow response times from header bidding partners or mediation platforms, there is a high risk that the ad will not be served before the user navigates away from the page or app. This results in lost ad opportunities and lower ad fill rates, as the system is unable to deliver an ad in time.

Moreover, in traditional systems using waterfall architectures, ad requests are often handled sequentially, meaning that one demand source is queried at a time. Each demand source is evaluated in a set order, and if one does not fill the request, the system moves to the next source. This "sequential" process adds significant delays, which are further compounded by network hops between mediation platforms, header bidding partners, and ad networks.

The technical challenge lies in the multiple network hops required in traditional systems, where each interaction between the header bidding partners, mediation platforms, and ad networks adds to the total processing time. As a result, many ad opportunities are lost not because of a lack of bids, but because the system is too slow to complete the ad selection and delivery process within the available timeframe.

For publishers, this latency issue directly impacts revenue, as each lost ad opportunity reduces their ability to monetize their inventory effectively. Even publishers with large technology teams struggle to maintain optimal system performance as they face the increasing complexity of managing multiple demand sources. To solve these issues, a system is needed that integrates both client-side and server-side optimizations, allowing publishers to streamline ad delivery and improve yield.

SUMMARY

Before the present system(s) and method(s), are described, it is to be understood that this application is not limited to the particular system(s), and methodologies described, as there can be multiple possible embodiments which are not expressly illustrated in the present disclosures. It is also to be understood that the terminology used in the description is for the purpose of describing the particular implementations or versions or embodiments only and is not intended to limit the scope of the present application.

The present system(s) and method(s) provides an optimized solution for publishers through a combination of client-side and server-side integrations, allowing publishers to maximize ad yield and ensure smooth ad delivery. By integrating both header bidding partners and mediation platforms, the system facilitates more efficient bidding and ensures that the publishers can leverage more demand sources to increase competition for publisher's ad inventory.

In one implementation, a method for optimizing advertisement yield and reducing advertisement latency is disclosed. The method may comprise receiving an ad request associated with an ad placement. Further, the method may comprise initiating parallel bid requests to a mediation platform, a plurality of header bidding partners, and a plurality of ad networks. Subsequently, a plurality of bids from the plurality of header bidding partners may be received. A highest bid from the plurality of bids may be determined. Parallelly, the method may comprise determining a prioritized list of demand sources based on bids from internal sources of the mediation platform, while the highest bid is determined from the plurality of header bidding partners.

An ad object for the highest bid may be requested from a header bidding partner of the plurality of header bidding partners. Further, the highest bid and the ad object may be cached. It may be noted that the caching may be performed to reduce ad delivery time. The cached bid and ad object may be submitted in a single hop to the mediation platform, thereby reducing overall latency.

Further, the highest bid and the ad object may be submitted to the mediation platform upon receiving a request from the mediation platform. The mediation platform may mediate the highest bid with other bids from the prioritized list of demand sources of the mediation platform and the plurality of ad networks. Further, the method may comprise selecting, for display on a client device, one of the ad object from the header bidding partner if the mediation platform fails to confirm a higher bid than the header bidding partner, and an ad object from the mediation platform if the mediation platform confirms that the mediation platform has a higher bid than the header bidding partner.

In one aspect, the aforementioned method for optimizing advertisement yield and reducing advertisement latency may be performed by a processor coupled to a memory. The processor is configured to execute program instructions stored in the memory for optimizing advertisement yield and reducing advertisement latency.

In another implementation, a non-transitory computer program product having embodied thereon a computer program for optimizing advertisement yield and reducing advertisement latency is disclosed. The program may comprise a program code for receiving an ad request associated with an ad placement. Further, the program may comprise a program code for initiating parallel bid requests to a mediation platform, a plurality of header bidding partners, and a plurality of ad networks. Subsequently, the program may comprise a program code for receiving a plurality of bids from the plurality of header bidding partners. Furthermore, the program may comprise a program code for determining a highest bid from the plurality of bids. The program further may comprise a program code for, parallelly, determining a prioritized list of demand sources based on bids from internal sources of the mediation platform, while the highest bid is determined from the plurality of header bidding partners.

The program may comprise a program code for requesting an ad object for the highest bid from a header bidding partner of the plurality of header bidding partners. Further, the program may comprise a program code for caching the highest bid and the ad object. It may be noted that the caching may be performed to reduce ad delivery time. The cached bid and ad object may be submitted in a single hop to the mediation platform, thereby reducing overall latency.

Further, the program may comprise a program code for submitting the highest bid and the ad object to the mediation platform upon receiving a request from the mediation platform. The mediation platform may mediate the highest bid with other bids from the prioritized list of demand sources of the mediation platform and the plurality of ad networks. Further, the program may comprise a program code for selecting, for display on a client device, one of the ad object from the header bidding partner if the mediation platform fails to confirm a higher bid than the header bidding partner, and an ad object from the mediation platform if the mediation platform confirms that the mediation platform has a higher bid than the header bidding partner.

BRIEF DESCRIPTION OF THE DRAWINGS

The foregoing detailed description of embodiments is better understood when read in conjunction with the appended drawings. For the purpose of illustrating of the present subject matter, an example of a construction of the present subject matter is provided as figures, however, the invention is not limited to the specific method and system for optimizing advertisement yield and reducing advertisement latency disclosed in the document and the figures.

The present subject matter is described in detail with reference to the accompanying figures. In the figures, the left-most digit(s) of a reference number identifies the figure in which the reference number first appears. The same numbers are used throughout the drawings to refer to various features of the present subject matter.

Figure 1:
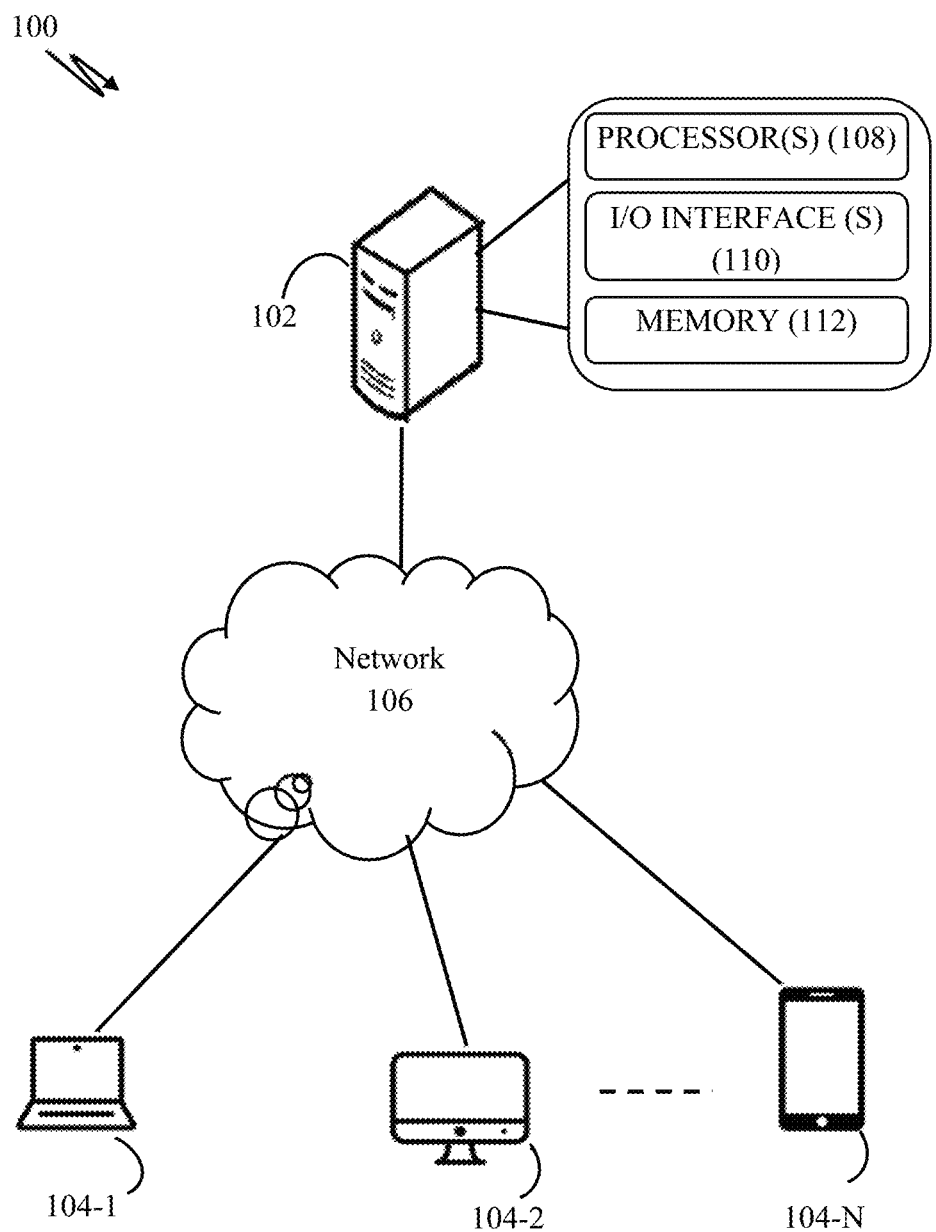
FIG. 1 illustrates a network implementation for optimizing advertisement yield and reducing advertisement latency, in accordance with an embodiment of the present subject matter.

The figure depicts an embodiment of the present disclosure for purposes of illustration only. One skilled in the art will readily recognize from the following discussion that alternative embodiments of the structures and methods illustrated herein may be employed without departing from the principles of the disclosure described herein.

DETAILED DESCRIPTION

Some embodiments of this disclosure, illustrating all its features, will now be discussed in detail. The words "receiving," "initiating," "determining," "comparing," "caching," "requesting," "submitting," "selecting," "displaying," and other forms thereof, are intended to be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any system and methods similar or equivalent to those described herein can be used in the practice or testing of embodiments of the present disclosure, the exemplary, system and methods are now described.

The disclosed embodiments are merely examples of the disclosure, which may be embodied in various forms. Various modifications to the embodiment will be readily apparent to those skilled in the art and the generic principles herein may be applied to other embodiments. However, one of ordinary skill in the art will readily recognize that the present disclosure is not intended to be limited to the embodiments described but is to be accorded the widest scope consistent with the principles and features described herein.

When using the traditional systems, publishers are often forced to rely on sequential ad requests, also known as waterfall architecture. This approach not only delays the ad delivery but also prevents publishers from fully monetizing their available ad space. These delays, caused by waiting for each demand source to respond before moving to the next, can significantly reduce the effectiveness of the publisher's ad placements.

The present system introduces an advanced Software Development Kit (SDK) that allows publishers to integrate with multiple demand partners, including Google™, Amazon™, and other regional ad networks, in a seamless manner. This integration is designed to work with both client-side and server-side components, ensuring that ads are delivered faster and with minimal latency.

The invention further introduces an ad server, which acts as an orchestration layer. This server manages the entire auction process, ensuring that bids from multiple networks are compared and the winning bid is selected in real time. Additionally, the system includes a yield optimizer, which constantly monitors the bids and adjusts the floor price to ensure the highest possible revenue for the publisher.

The present subject matter discloses a method and a system for optimizing advertisement yield and reducing advertisement latency. The system may be a mobile application installed on an ad publisher's device. The mobile application may be in the form of a Software Development Kit (SDK), which can be integrated with one or more mediation platforms, a plurality of header bidding partners, and ad networks. The system receives an ad request from a client device running a mobile application. Further, the system retrieves ad placement details from a remote configuration. The ad placement details include information about applicable ad partners, supported ad types, configuration settings for processing, and cache handling instructions. Further, the system initiates parallel bid requests simultaneously to:

One or more mediation platforms (e.g., Google Ad Manager™, Google Ad Mob™, MAX by Applovin™)

A plurality of header bidding partners (e.g., Amazon Publisher Services™, PubMatic™)

Various ad networks

Further, as bids are received from header bidding partners, the system determines in real-time which bid is the highest among them. Concurrently, the system receives and processes prioritized lists of demand sources from the mediation platforms. The system further requests the ad object associated with the highest bid from the winning header bidding partner. The highest bid and its corresponding ad object are cached in volatile memory to reduce ad delivery time.

Further, the system submits the highest bid from header bidding partners and the cached ad object to the mediation platforms in a single operation, using this bid as a floor price. The mediation platforms then compare this floor price against their internal demand sources and ad networks. Based on the mediation platforms' responses, the system makes a final decision:

If neither mediation platform confirms a higher bid, the system selects, for display on a client device, the cached ad object from the header bidding partner.

If a mediation platform confirms a higher bid, the system selects, for display on the client device, the ad object provided by that mediation platform.

In cases where no suitable bids are received from header bidding partners or mediation platforms, the system may utilize ad networks as backfill options through a waterfall architecture. The system can dynamically adjust the positioning of backfill ad networks based on real-time performance data.

Throughout this process, the system employs caching strategies to reduce latency. If a cache hit occurs for a winning ad object, it can be displayed immediately without initiating new ad requests.

This approach allows the system to optimize ad yield by considering multiple demand sources while minimizing latency through parallel processing, efficient caching, and strategic use of backfill options. The SDK integration enables seamless operation within the publisher's app ecosystem, providing a powerful tool for maximizing ad revenue while maintaining a smooth user experience.

In traditional ad delivery systems, a waterfall architecture is commonly used, where ad requests are sequentially sent to multiple demand sources (such as ad networks) based on predefined priorities. In this architecture, an ad request is first sent to the top priority demand source, and if it does not return a valid ad, the request is sent to the next demand source in line. This process continues until an ad is returned. The primary issue with this approach is the sequential nature of the requests, which introduces significant latency into the ad-serving process.

Traditional systems do not utilize parallel processing, meaning that ad requests are handled one after the other in a slow and inefficient manner. Each additional request adds time, delaying the delivery of ads to users. Due to these delays, publishers face significant challenges in monetizing their ad inventory effectively. Ads are often not served fast enough before the user moves away from the webpage or app, causing lost ad opportunities. As a result, publishers experience a reduction in revenue since they are unable to fully capitalize on available ad placements.

The present subject matter solves the problems involved in the traditional system to increase the revenue of the publishers by reducing ad latency and improving ad fill rates. In an embodiment, the present subject matter teaches a method to avoid no-bid scenarios. In another embodiment, the present subject matter teaches a method for optimizing memory usage in a multi-layered header bidding process, wherein the method involves caching only an object having a highest bid.

Referring now to FIG. 1, a network implementation 100 of a system 102 for optimizing advertisement yield and reducing advertisement latency is disclosed. Initially, the system 102 receives an ad request from a client (not shown in FIG. 1). The client may be a mobile application, a digital platform, or a web based platform. In an example, the system may be installed on a publisher's device 104-1. It may be noted that the one or more users (e.g. ad publishers) may access the system 102 through one or more publisher devices 104-2, 104-3 . . . 104-N, collectively referred to as publisher devices 104, hereinafter, or applications residing on the publisher devices 104. The ad request is originated form a client device running the mobile application. Further, the system 102 receives the ad request from the publisher devices 104. The system may also 102 receive a feedback from the publisher using the publisher devices 104.

Although the present disclosure is explained considering that the system 102 is implemented on a server, it may be understood that the system 102 may be implemented in a variety of computing systems, such as a laptop computer, a desktop computer, a notebook, a workstation, a virtual environment, a mainframe computer, a server, a network server, a cloud-based computing environment. It will be understood that the system 102 may be accessed by multiple users through one or more publisher devices 104-1, 104-3 . . . 104-N. In one implementation, the system 102 may comprise the cloud-based computing environment in which the user may operate individual computing systems configured to execute remotely located applications. Examples of the publisher devices 104 may include, but are not limited to, a portable computer, a personal digital assistant, a handheld device, and a workstation. The publisher devices 104 are communicatively coupled to the system 102 through a network 106.

In one implementation, the network 106 may be a wireless network, a wired network, or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

In one embodiment, the system 102 may include at least one processor 108, an input/output (I/O) interface 110, and a memory 112. The at least one processor 108 may be implemented as one or more microprocessors, microcomputers, microcontrollers, digital signal processors, Central Processing Units (CPUs), state machines, logic circuitries, and/or any devices that manipulate signals based on operational instructions. Among other capabilities, the at least one processor 108 is configured to fetch and execute computer-readable instructions stored in the memory 112.

The I/O interface 110 may include a variety of software and hardware interfaces, for example, a web interface, a graphical user interface, and the like. The I/O interface 110 may allow the system 102 to interact with the user directly or through the client devices 104. Further, the I/O interface 110 may enable the system 102 to communicate with other computing devices, such as web servers and external data servers (not shown). The I/O interface 110 can facilitate multiple communications within a wide variety of networks and protocol types, including wired networks, for example, LAN, cable, etc., and wireless networks, such as WLAN, cellular, or satellite. The I/O interface 110 may include one or more ports for connecting a number of devices to one another or to another server.

The memory 112 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, Solid State Disks (SSD), optical disks, and magnetic tapes. The memory 112 may include routines, programs, objects, components, data structures, etc., which perform particular tasks or implement particular abstract data types. The memory 112 may include programs or coded instructions that supplement applications and functions of the system 102. In one embodiment, the memory 112, amongst other things, serves as a repository for storing data processed, received, and generated by one or more of the programs or the coded instructions.

As there are various challenges observed in the existing art, the challenges necessitate the need to build the system 102 for optimizing advertisement yield and reducing advertisement latency. At first, a user may use the user device 104 to access the system 102 via the I/O interface 110. The user may register the publisher devices 104 using the I/O interface 110 in order to use the system 102. In one aspect, the user may access the I/O interface 110 of the system 102. The detail functioning of the system 102 is described below with the help of figures.

The system 102 may receive an ad request from a client. The client may be a mobile application, a digital platform, or a web based platform. The ad request may be associated with an ad placement. Further, the system 102 may retrieve ad placement details from a remote configuration.

The remote configuration serves as a centralized repository of information that allows for dynamic updates and flexibility in managing ad placements across various clients, applications and platforms. Further, the remote configuration eliminates the need for individual publishers to manually adjust settings or configurations across all publisher's systems, which can be prone to error and inefficiency. As industry regulations and platform updates evolve, the remote configuration ensures that publishers can quickly adapt without the need for extensive reconfigurations. This is crucial in maintaining compliance with tightening privacy regulations and keeping pace with industry leaders like Google™ and Meta™. By dynamically managing ad placements and partner integrations, the remote configuration helps ensure that ad servers are optimized for better performance, reducing inefficiencies and improving ad delivery speed.

Upon receiving the ad request, the system 102 retrieves the ad placement details. The ad placement details comprises a list of applicable ad partners and their supported ad types, configuration settings for series or parallel processing, and cache handling instructions.

The list of applicable ad partners included in the ad placement details enables the system to target specific partners that are relevant to the particular ad placement. This targeted approach ensures that only appropriate ad partners are contacted, optimizing the bidding process and potentially improving the quality and relevance of the ads displayed. The supported ad types for each partner are also specified, allowing the system to filter and match ad requests with compatible ad formats, thereby reducing the likelihood of incompatible ad serving.

The configuration settings for series or parallel processing provide the system with instructions on how to execute the ad request workflow. Parallel processing allows for simultaneous bid requests to multiple partners, potentially reducing overall latency. In certain embodiments, series processing to deliver the ad may be preferred.

Further, the cache handling instructions guide the system on how to manage ad objects and bid information. It may be noted that the caching reduces ad delivery time by storing frequently used or recently retrieved ad data. The system 102 can use these instructions to determine what information to cache, how long to retain it, and when to invalidate or refresh the cache, thus optimizing the trade-off between data freshness and response time.

By utilizing the ad placement details, the system 102 can make informed decisions throughout the ad serving process, from partner selection and bid management to ad delivery and caching strategies, ultimately aiming to optimize advertisement yield and reduce latency.

Further to receiving the ad request, the system 102 may initiate a parallel bid request to a mediation platform, a plurality of header bidding partners, and, a plurality of ad networks. The system utilizes a parallel request processing architecture for sending the ad request to all partners in a single hop.

The parallel request processing architecture is designed to optimize ad yield and minimize latency by simultaneously initiating bid requests to multiple partners. This approach allows for efficient gathering of competitive bids from various sources without introducing unnecessary delays.

When an ad request is received, the system 102 immediately triggers parallel bid requests to three main categories of partners:

1. Mediation Platform: A call is made to a primary mediation platform without delay. The mediation platform sends the ad request to one or more demand partners that are linked to the mediation platform. In an embodiment, the system may make a call to one or more mediation platform at once.

2. Header Bidding Partners: Concurrent bid requests are sent to all applicable header bidding partners. The header bidding partners participate in real-time auctions, submitting their bids for the ad placement. The system collects these bids as they arrive, allowing for a dynamic and competitive bidding process.

3. Ad Networks: Simultaneously, bid requests are dispatched to various ad networks. These networks may not always provide real-time bids but are crucial for ensuring fill rates and can serve as backfill options in a waterfall architecture.

The parallel architecture ensures that the system doesn't wait for responses from one partner before proceeding to the next. This simultaneous approach significantly reduces the overall time required to collect bids from all potential sources. By initiating these requests in parallel, the system can effectively manage timeouts and handle varying response times from different partners without compromising the ad serving process.

The ad networks serve as a safety net in the waterfall architecture, ensuring that an ad can still be served even if real-time header bidding partners fail to provide suitable bids. This approach maximizes the chances of filling the ad placement while maintaining the efficiency of the parallel processing model.

Further to initiating the parallel bid request, the system 102 determines, in real time, a highest bid from a plurality of bids received from the plurality of header bidding partners. The highest bid is a winning bid amongst the plurality of bids received from the plurality of header bidding partners. The real-time determination of the highest bid is important for maximizing revenue potential while maintaining efficiency of an ad delivery. As the system 102 receives bids from various header bidding partners, the system 102 continuously evaluates and compares the received bids to identify the highest bid. It may be noted that the highest bid determination process occurs simultaneously with other operations, such as the mediation platform's bid collection, to minimize overall latency.

In an embodiment, the highest bid from the header bidding partner is dynamically used as a floor price before submitting the request to the mediation platform. The highest bid serves as a benchmark for comparison with bids from other sources, including the mediation platform and ad networks. Further, the system may set the highest bid as a floor price when submitting requests to the mediation platform, ensuring that subsequent bids meet or exceed this threshold.

In another embodiment, the system 102 may be integrated with one or more header bidding platforms wherein each header bidding platform comprises a plurality of header bidding partners. Further, each header bidding platform submits a highest bid to the system. Further, the system determines highest bid amongst the one or more header bidding platforms. Let's assume that the system is integrated with one or more header bidding platforms named as ABC, PQR, and XYZ. Each header bidding platform (ABC, PQR, and XYZ) conducts a bidding process internally and submits the highest bid to the system. Let's assume that the highest bid from ABC is $15, PQR is $12, and XYZ is $14. The system then determines that the highest bid is received from ABC and then the system automatically sends a request to the ABC header bidding platform to share an ad object. The ABC header bidding platform fetches the ad object from a winning header bidder partner and shares the ad object with the system.

Further to determining the highest bid, the system 102 may simultaneously determine a prioritized list of demand sources based on bids from internal sources of the mediation platform, while the highest bid is determined from the plurality of header bidding partners.

The prioritized list of demand sources from the mediation platform's internal sources (also referred as demand partners) is typically based on one or more factors such as, but not limited to, historical performance, bid rates, and relevance to the specific ad placement. The prioritization allows the system to efficiently manage and evaluate bids from multiple sources within the mediation platform.

The parallel processing of bids from different sources (header bidding partners and mediation platform) allows for a fair comparison between these two major bid streams. It ensures that the highest bid from header bidding partners can be effectively compared against the top bids from the mediation platform's prioritized list, without introducing additional latency to the overall ad serving process.

While the system determines the prioritized list of demand sources, the system 102 may parallelly request an ad object for the highest bid from a header bidding partner of the plurality of header bidding partners. By requesting the ad object associated with the highest bid, the system ensures that it has the necessary creative content ready for immediate display if the highest bid ultimately wins. This preemptive action reduces the time required to serve the ad, as the system doesn't need to wait for the ad object to be retrieved after the final decision is made.

Further, the system 102 may cache the requested ad object and associated highest bid. The caching process involves storing both the highest bid and the ad object in the system's volatile memory. The use of volatile memory, such as, but not limited to, RAM, ensures that the cached data can be accessed with minimal delay, significantly improving retrieval times when compared to persistent storage options.

The caching strategy serves multiple purposes in enhancing the efficiency of the ad serving process:

1. Reduced ad delivery time: By storing the highest bid and ad object in cache, the system can quickly retrieve this information without the need to re-request it from the header bidding partner.

2. Single-hop submission: The cached bid and ad object can be submitted together to the mediation platform in a single operation. This consolidated submission eliminates the need for multiple back-and-forth communications between the system and the mediation platform, thereby reducing network latency and processing time.

Furthermore, when the mediation platform requests information, the system 102 may submit both the highest bid and the associated ad object in a single operation. The mediation platform then compares the submitted highest bid from header bidding partners against bids from its own prioritized list of demand sources and the plurality of ad networks. This mediation process is designed to ensure that the most competitive bid wins, regardless of its source. The mediation platform may consider not only the bid values but also other factors such as ad quality, relevance, and potential user engagement.

By involving the mediation platform in this final decision-making step, the system 102 leverages additional demand sources and potentially increases overall yield. This approach combines the benefits of header bidding (which often provides highly competitive bids) with the broader reach and diverse demand of the mediation platform and ad networks. The result is a comprehensive evaluation of all available options to serve the most appropriate and valuable ad for the given placement.

Further, the system 102 may select, for display on a client device, an ad object having the highest price between the header bidder partner and the mediation platform. The system then sends the selected ad object through the network to the publisher. The publisher then sends the ad object to a client device on which an application/web based (e.g. mobile application) is running. The ad is displayed on the client device.

It may be noted that the system may select the ad object by deciding the highest price between the header bidder partner and the mediation platform. When the mediation platform fails to confirm a higher bid than the header bidding partner, the system may select the ad object from the header bidding partner. This scenario occurs when the highest bid from the header bidding partners, which was submitted as a floor price to the mediation platform, remains the most competitive offer. In this case, the system can quickly serve the cached ad object, minimizing latency and ensuring a prompt ad display.

When the mediation platform confirms that it has a higher bid than the header bidding partner, the system selects, for display on a client device, an ad object from the mediation platform. This situation arises when one of the mediation platform's demand sources or ad networks provides a more competitive bid than the header bidding partners. In this case, the mediation platform supplies the ad object after requesting the ad object from a demand source of the one or more demand sources. Further, the system displays the ad object of the demand source of the mediation platform on the client device.

This approach ensures that the most valuable ad is always displayed, maximizing revenue potential while maintaining efficiency. By leveraging the cached header bidding ad object and the mediation platform's broader demand pool, the system can make informed decisions quickly, reducing overall ad serving latency.

It may be noted that the mediation platform does not share the price of the bid with the system for an ad request. Thus, the system cannot compare the prioritized list of demand sources with the header bidding partner having the highest bid. Hence, it becomes a challenge to determine the highest bid between the highest bid from the header bidder and the mediation platform.

This limitation in bid information sharing from the mediation platform introduces a technological challenge in determining the highest bid. To address this challenge, the system employs a strategic approach. It submits the highest bid from the header bidding partner to the mediation platform, effectively using it as a floor price. This approach serves two purposes:

1. It ensures that any bid accepted by the mediation platform must exceed this floor price, potentially increasing overall yield.

2. It provides a mechanism for the mediation platform to make an informed decision without directly revealing its bid prices to the system.

The mediation platform then compares the floor price (highest bid from the header bidding partner) against internal bids and makes a final decision. It either accepts the header bidding ad if no internal bid exceeds the floor price, or it serves its own ad if a higher bid is available.

This process allows the system to optimize ad yield without direct bid comparison. Instead, it relies on the mediation platform's decision as an indirect indicator of bid competitiveness.

In an embodiment, the system 102 may utilize a cache hit determination process. The cache hit determination process involves the processor 108 checking if the ad object associated with the highest bid, considering both the mediation platform and the plurality of header bidding partners, is already stored in the cache. This check is crucial for optimizing ad delivery speed and reducing overall system latency.

When a cache hit occurs, meaning the relevant ad object is found in the cache, the system can immediately retrieve and display the cached ad object on the client device. This rapid retrieval eliminates the need to initiate a new ad request to either the header bidding partners or the mediation platform. By bypassing these external requests, the system significantly reduces the time required to serve an ad, thereby minimizing ad delivery latency.

The cache hit determination is effective in scenarios where similar ad requests are made in quick succession or when certain ad objects are frequently requested. By leveraging the cached data, the system can respond almost instantaneously to subsequent requests for the same or similar ad placements, providing a seamless and efficient ad serving experience.

The cache hit determination also complements the earlier described caching strategy, where the highest bid and its associated ad object are stored in volatile memory. This combination of caching the highest bid and implementing a cache hit check creates a robust system for rapid ad retrieval and display, further optimizing the ad serving process and enhancing overall system performance.

In an embodiment, the system may utilize the plurality of ad networks as backfill to fill the ad placement through waterfall architecture upon failure to receive bids from the plurality of header bidding partners and mediation platform. The system may be configured to prioritize backfill ad networks based on predefined criteria, such as historical fill rates, ad performance, or revenue potential, to optimize ad selection when the plurality of header bidding partners and mediation platform fail to provide an ad or a winning bid or an ad with a bid higher than a threshold ad bid decided by the client. Subsequently, the system may be configured to dynamically adjust positioning of backfill ad networks in waterfall architecture based on real-time data, including ad inventory availability and user engagement metrics.

Consider an example, the system is used for displaying ads in a mobile game application. When a user reaches a natural break point in the game, the app triggers an ad request for an interstitial video ad placement.

The system receives this ad request and immediately initiates parallel bid requests to:

| Mediation Platform | Header Bidding Partners |
| --- | --- |
| Google Ad Manager ™ | Amazon Hub Centre ™ |
| — | PubMatic ™ |

As responses come in, the system processes the responses in real-time:

Let's assume that Amazon Hub Centre™ returns a bid of $10 Cost Per Mille (CPM) and PubMatic™ returns a bid of $12 CPM. Based on the received bids, the system determines that PubMatic has the highest bid among header bidding partners at $12 CPM. The system requests and caches PubMatic's ad object in volatile memory.

Simultaneously, the system receives prioritized lists of demand sources from Google Ad Manager™, though the actual bid amounts are not disclosed.

Further, the system submits the $12 CPM bid from PubMatic as a floor price to both Google Ad Manager™, along with the cached ad object, in a single hop.

Google Ad Manager™ responds that it has a higher bid. The system then displays the ad object provided by Google Ad Manager™, as it confirmed a higher bid than the header bidding partner's $12 CPM. It may be noted that the entire process occurs within milliseconds, optimizing ad yield by considering multiple demand sources while minimizing latency through parallel processing and efficient caching strategies.

In another example, when the system does not receive a higher bid from the mediation platform (Google Ad Manager™), the system displays the ad object, having the highest bid, received from the header bidding partner. It may be noted that the ad object received from the header bidding partner is already cached by the system; hence the system is able to display the ad within nanoseconds of receiving the responses from the mediation platforms.

The system retrieves the cached ad object and displays it on the client device immediately, without the need for any additional network requests. This process occurs within nanoseconds (in certain scenarios milliseconds) of receiving the responses from the mediation platforms, significantly reducing latency and ensuring a smooth user experience.

In an embodiment, and not by way of any limitation, the publisher may integrate with multiple mediation platforms and header bidding partners. In such cases, the system sends the parallel bid requests to the multiple mediation platforms and the header bidding partners.

The rapid display of the ad is made possible by the system's efficient caching mechanism and parallel processing approach, which allows it to have the winning ad ready for display as soon as the final decision is made.

Although the present invention is primarily described and illustrated with examples focused on mobile applications for in-app advertising, the same process and architecture can be applied to web-based platforms. In such scenarios, while the core mechanisms of parallel bid requests, caching, and real-time bid submission remain applicable, the specific mediation platforms and header bidding partners may vary.

Figure 2:
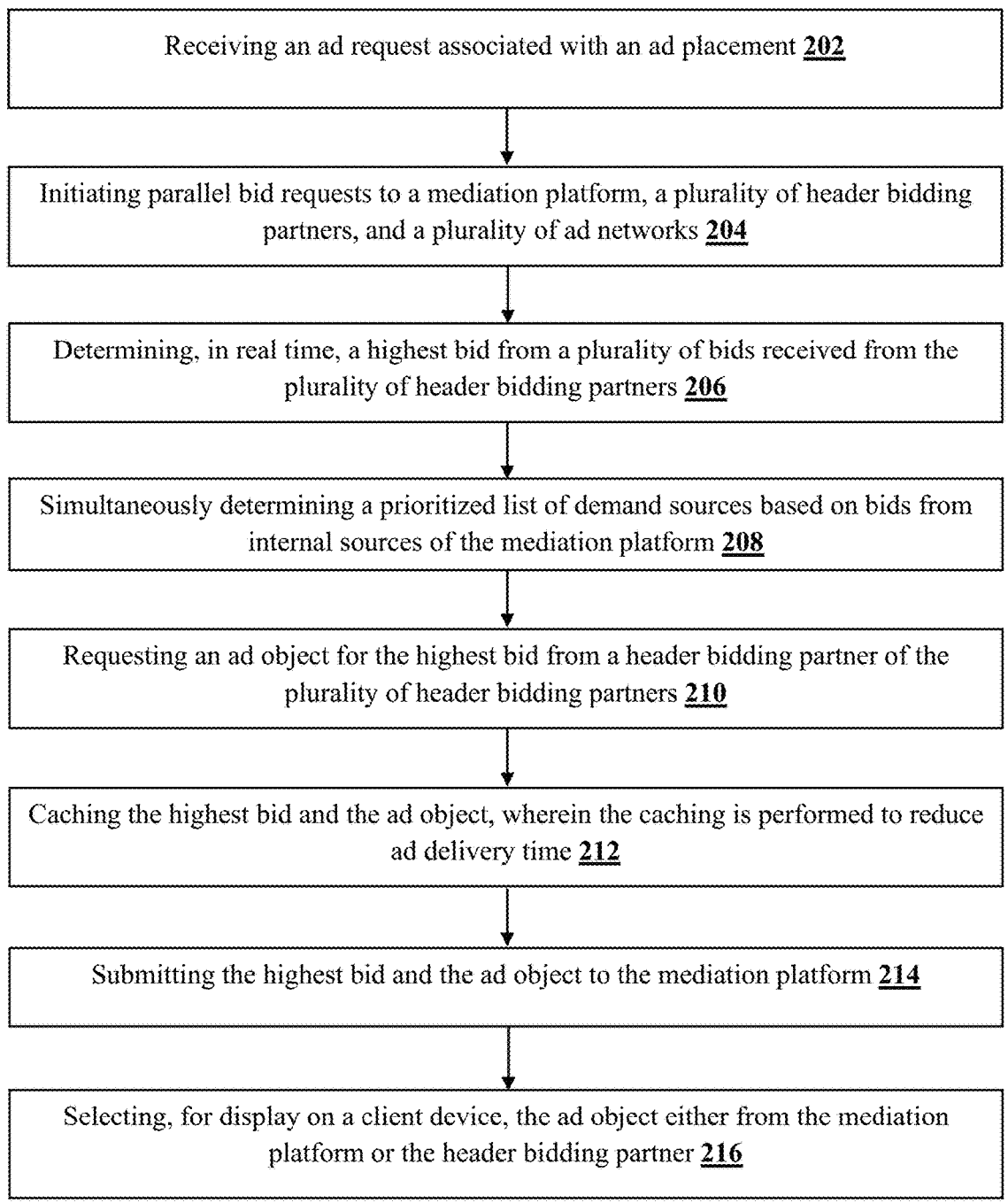
FIG. 2 illustrates a method for optimizing advertisement yield and reducing advertisement latency, in accordance with an embodiment of the present subject matter.

Referring now to FIG. 2, a method 200 for optimizing advertisement yield and reducing advertisement latency is shown, in accordance with an embodiment of the present subject matter. The method 200 may be described in the general context of computer executable instructions. Generally, computer executable instructions can include routines, programs, objects, components, data structures, procedures, modules, functions, etc., that perform particular functions or implement particular abstract data types.

The order in which the method 200 is described is not intended to be construed as a limitation, and any number of the described method blocks can be combined in any order to implement the method 200 or alternate methods for optimizing advertisement yield and reducing advertisement latency. Additionally, individual blocks may be deleted from the method 200 without departing from the scope of the subject matter described herein. Furthermore, the method 200 for optimizing advertisement yield and reducing advertisement latency can be implemented in any suitable hardware, software, firmware, or combination thereof. However, for ease of explanation, in the embodiments described below, the method 200 may be considered to be implemented in the above-described system 102.

At block 202, an ad request associated with an ad placement may be received.

At block 204, the method may comprise initiating parallel bid requests to a mediation platform, a plurality of header bidding partners, and a plurality of ad networks.

At block 206, a plurality of bids from the plurality of header bidding partners may be received. A highest bid from the plurality of bids may be determined.

At block 208, a prioritized list of demand sources may be simultaneously determined based on bids from internal sources of the mediation platform, while the highest bid is determined from the plurality of header bidding partners.

At block 210, an ad object for the highest bid may be requested from a header bidding partner of the plurality of header bidding partners.

At block 212, the highest bid and the ad object may be cached. It may be noted that the caching may be performed to reduce ad delivery time. The cached bid and ad object may be submitted in a single hop to the mediation platform, thereby reducing overall latency.

At block 214, the highest bid and the ad object may be submitted to the mediation platform upon receiving a request from the mediation platform. The mediation platform may mediate the highest bid with other bids from the prioritized list of demand sources of the mediation platform and the plurality of ad networks.

At block 216, the method may comprise selecting, for display on a client device, one of the ad object from the header bidding partner if the mediation platform fails to confirm a higher bid than the header bidding partner, and an ad object from the mediation platform if the mediation platform confirms that the mediation platform has a higher bid than the header bidding partner.

Figure 3:
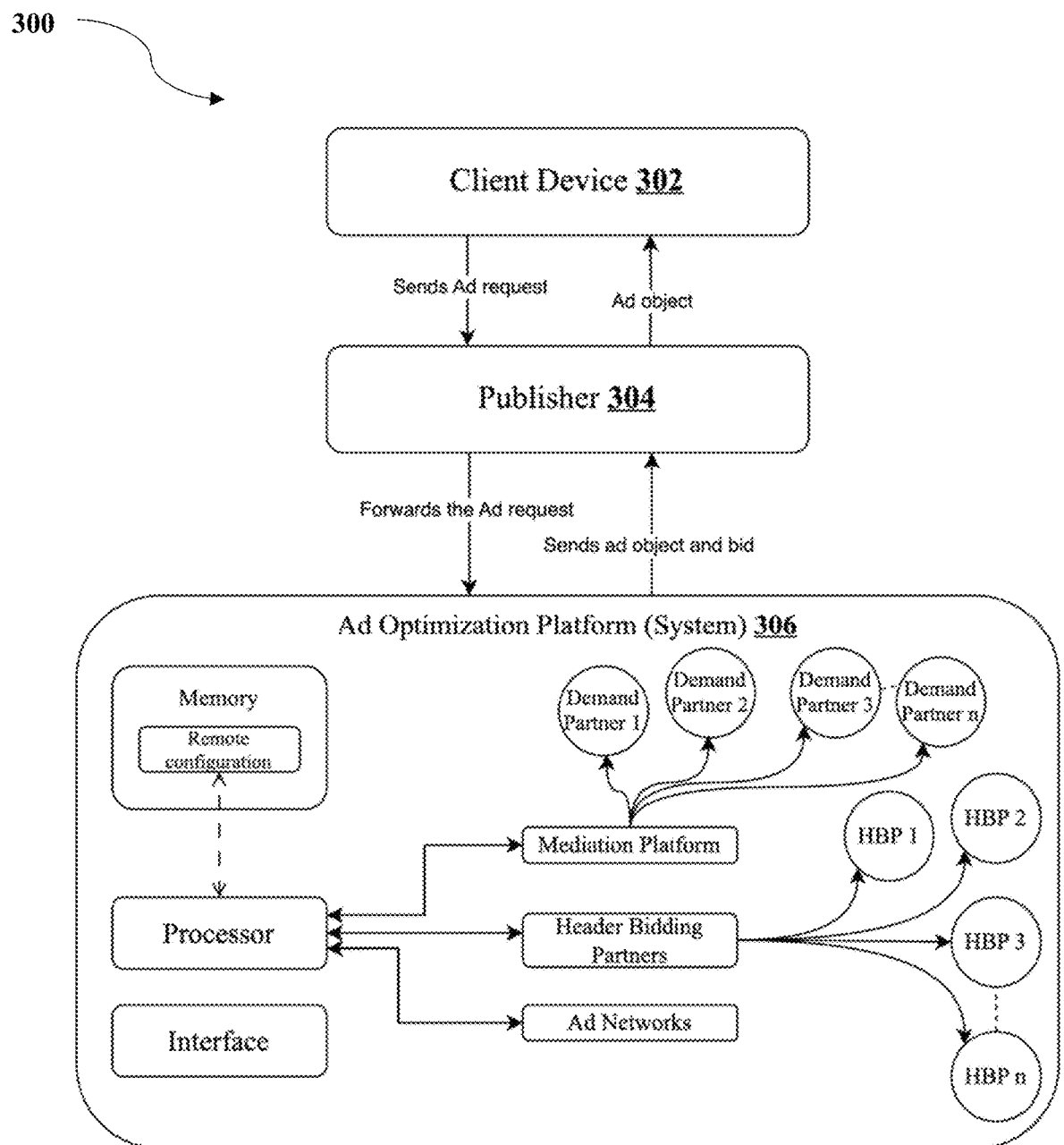
FIG. 3 illustrates an architecture of the system for optimizing advertisement yield and reducing advertisement latency, in accordance with an embodiment of the present subject matter.

Referring to FIG. 3, an architecture 300 for optimizing advertisement yield and reducing advertisement latency is shown. The architecture 300 comprises several interconnected components that work together to efficiently process ad requests and deliver advertisements. The architecture 300 comprises a client device 302, a publisher 304, and an ad optimization platform (system) 306. The system 306 in FIG. 3 is same as the system 102 in FIG. 1. For explaining the architecture in detail, FIG. 3 is shown separately.

The client device 302 represents the end-user's interface, such as a mobile application or website, where ad requests originate. The client device 302 initiates the ad serving process by sending an ad request to the publisher 304 and displays an ad object to the user.

The publisher 304 facilitates communication between the client device 302 and the ad optimization platform 306. The publisher 304 may be a server or an application that receives the ad request from the client device 302, forwards it to the ad optimization platform 306 for processing, and then relays the final ad object back to the client device 302 for display.

The ad optimization platform 306 is responsible for handling and optimizing ad requests to maximize yield while minimizing latency. The ad optimization platform 306 comprises a processor, a memory, and an interface. The memory comprises a remote configuration. The remote configuration component provides dynamic settings that allow the system to adapt to changing conditions and requirements, such as prioritizing ad partners and managing bid rules, which the processor utilizes to process ad requests efficiently. Further, the processor receives the ad requests, and initiates the parallel bid requests to various demand sources such as the mediation platform, header bidding partners, and ad networks. The parallel processing ensures that all potential sources are queried simultaneously, reducing overall latency.

To further optimize performance, the memory component of the ad optimization platform caches the highest bid and corresponding ad object. The caching mechanism, implemented in volatile memory as described in claim 5, allows for quick retrieval and submission of bid information to the mediation platform in a single operation, significantly reducing ad delivery time and overall latency.

The user interface is used to manage communication between the client device 302, the publisher 304, and external demand partners, ensuring smooth data flow throughout the ad serving process. The system 306 interacts with multiple demand sources, including a Mediation Platform, Header Bidding Partners (HBPs), and Ad Networks. The Mediation Platform represents a group of demand partners (Demand Partner 1, Demand Partner 2, Demand Partner 3, . . . . Demand Partner n), each competing internally before presenting their best bid.

Multiple Header Bidding Partners (HBP1, HBP2, HBP3, . . . . HBP n) conduct real-time auctions and return their highest bids to the processor. These bids are then compared with those from the mediation platform and ad networks to determine the most competitive offer. As noted in claim 4, the highest bid from the header bidding partners is dynamically used as a floor price when submitting the request to the mediation platform, ensuring that any accepted bid meets or exceeds this threshold.

Ad Networks, while part of the bidding process, may not submit real-time bids as mentioned in claim 8. Instead, they can serve as backfill options, utilizing a waterfall architecture to fill ad placements when bids from header bidding partners and the mediation platform are unavailable or unsatisfactory, as described in claim 9.

After comparing all bids, the processor selects the winning bid and requests the corresponding ad object from the successful partner. This ad object is then sent back through the Publisher (e.g. publisher server) 304 to the Client Device 302 for display.

Exemplary embodiments discussed above may provide certain advantages. Though not required to practice aspects of the disclosure, these advantages may include those provided by the following features.

Some embodiments of the system and the method enable the reduction of advertisement latency by processing parallel bid requests to mediation platforms, header bidding partners, and ad networks, ensuring faster ad delivery without waiting for sequential responses.

Some embodiments of the system and the method enable higher ad yield by allowing simultaneous real-time bidding from multiple sources, ensuring that the highest possible bid is selected from header bidding partners or mediation platform demand sources.

Some embodiments of the system and the method enable improved resource efficiency through the use of caching mechanisms that store the highest bid and ad object, reducing redundant network calls and optimizing system performance.

Some embodiments of the system and the method enable seamless integration with both header bidding and mediation platforms, ensuring that demand sources from both systems are processed and compared in real time, increasing the competitiveness of the bidding environment.

Some embodiments of the system and the method enable real-time price competition by simultaneously determining the highest bid from header bidding partners and prioritizing demand sources from mediation platforms, ensuring that the ad with the best price is delivered to the publisher.

Some embodiments of the system and the method enable enhanced ad fill rates by minimizing the network hops and processing delays typically seen in sequential bidding systems, resulting in fewer lost ad opportunities and more monetized impressions for publishers.

Some embodiments of the system and the method enable flexibility in ad delivery by accommodating multiple types of demand sources, including mediation platforms, header bidding partners, and ad networks, providing publishers with more options to maximize ad revenue from a diverse range of sources.

Although implementations for methods and system for optimizing advertisement yield and reducing advertisement latency have been described in language specific to structural features and/or methods, it is to be understood that the appended claims are not necessarily limited to the specific features or methods described. Rather, the specific features and methods are disclosed as examples of implementations for optimizing advertisement yield and reducing advertisement latency.

The invention claimed is:

1. A system for reducing advertisement latency, comprising:
   a mobile device having a memory and a processor running a software application; and
   a Software Development Kit (SDK) integrated with the software application, the SDK being stored in the memory and executed by the processor, the SDK being communicatively coupled to a publisher server, the SDK being configured for:
   receiving an ad request, from the mobile device, wherein the ad request is associated with an ad placement;
   initiating parallel bid requests to:
     a mediation platform,
     a plurality of header bidding partners, and
     a plurality of ad networks;
   determining in real time, a highest bid from a plurality of bids received from the plurality of header bidding partners;
   simultaneously determining a prioritized list of demand sources based on bids from internal sources of the mediation platform, while the highest bid is determined from the plurality of header bidding partners;
   requesting an ad object for the highest bid from a header bidding partner of the plurality of header bidding partners;
   caching the highest bid and the ad object on the mobile device, wherein the cached bid and ad object are submitted in a single hop to the mediation platform;
   submitting the highest bid and the ad object to the mediation platform, wherein the mediation platform mediates the highest bid with other bids from the prioritized list of demand sources of the mediation platform and the plurality of ad networks; and
   selecting, for display on the mobile device, one of:
     the ad object from the header bidding partner if the mediation platform fails to confirm a higher bid than the header bidding partner, and
     an ad object from the mediation platform if the mediation platform confirms that the mediation platform has a higher bid than the header bidding partner.

2. The system of claim 1, further comprising retrieving ad placement details from a remote configuration, and wherein the ad placement details comprises a list of applicable ad partners and their supported ad types, configuration settings for at least one of series processing and parallel processing, and cache handling instructions.

3. The system of claim 1, wherein the highest bid is a winning bid amongst the plurality of bids from the plurality of header bidding partners.

4. The system of claim 1, wherein the highest bid from the plurality of header bidding partners is dynamically used as a floor price before submitting the request to the mediation platform, wherein the mediation platform compares the floor price with the other bids from the mediation platform's demand sources.

5. The system of claim 1, wherein the caching of the highest bid and the ad object is performed in volatile memory for immediately retrieving the ad object when requested by the mediation platform to reduce latency.

6. The system of claim 1, wherein the parallel bid requests are initiated simultaneously across the mediation platform, header bidding partners, and ad networks.

7. The system of claim 1, further comprises determining a cache hit by checking if the ad object associated with the highest bid amongst the mediation platform and the plurality of header bidding partners is already stored in the cache, and in response to the cache hit, retrieve and display a cached ad object without initiating a new ad request to the plurality of header bidding partners and the mediation platform.

8. The system of claim 1, wherein the plurality of ad networks do not submit real-time bids.

9. The system of claim 1, further comprising utilizing the plurality of ad networks as backfill to fill the ad placement through waterfall architecture upon failure to receive bids from the plurality of header bidding partners and mediation platform.

10. The system of claim 1, further comprises prioritizing backfill ad networks based on predefined criteria, such as historical fill rates, ad performance, or revenue potential, to optimize ad selection when the plurality of header bidding partners and mediation platform fail to provide an ad or a winning bid or an ad with a bid higher than a threshold ad bid decided by a client.

11. The system of claim 1, wherein the processor is configured to dynamically adjust positioning of backfill ad networks in waterfall architecture based on real-time data, including ad inventory availability and user engagement metrics.

12. A method for reducing advertisement latency, comprising:
    executing, via a processor of a mobile device, a Software Development Kit (SDK) stored in a memory of the mobile device, the SDK being communicatively coupled to a publisher server, the SDK being configured for:
    receiving an ad request from the mobile device, wherein the ad request is associated with an ad placement;
    initiating parallel bid requests to:
        a mediation platform,
        a plurality of header bidding partners, and
        a plurality of ad networks;
    determining in real time, a highest bid from a plurality of bids received from the plurality of header bidding partners;
    simultaneously determining a prioritized list of demand sources based on bids from internal sources of the mediation platform, while the highest bid is determined from the plurality of header bidding partners;
    requesting, by the SDK, an ad object for the highest bid from a header bidding partner of the plurality of header bidding partners;
    caching the highest bid and the ad object on the mobile device, wherein the cached bid and ad object are submitted in a single hop to the mediation platform;
    submitting, by the SDK, the highest bid and the ad object to the mediation platform, wherein the mediation platform mediates the highest bid with other bids from the prioritized list of demand sources of the mediation platform and the plurality of ad networks; and
    selecting, for display on the mobile device, one of:
        the ad object from the header bidding partner if the mediation platform fails to confirm a higher bid than the header bidding partner, and
        an ad object from the mediation platform if the mediation platform confirms that the mediation platform has a higher bid than the header bidding partner.

13. The method of claim 12, further comprising retrieving ad placement details from a remote configuration, and wherein the ad placement details comprises a list of applicable ad partners and their supported ad types, configuration settings for at least one of series processing and parallel processing, and cache handling instructions.

14. The method of claim 12, wherein the highest bid is a winning bid amongst the plurality of bids from the plurality of header bidding partners.

15. The method of claim 12, wherein the highest bid from the plurality of header bidding partners is dynamically used as a floor price before submitting the request to the mediation platform, wherein the mediation platform compares the floor price with the other bids from the mediation platform's demand sources.

16. The method of claim 12, wherein the caching of the highest bid and the ad object is performed in volatile memory for immediately retrieving the ad object when requested by the mediation platform to reduce latency.

17. The method of claim 12, wherein the parallel bid requests are initiated simultaneously across the mediation platform, header bidding partners, and ad networks.

18. The method of claim 12, wherein the processor is further configured to determine a cache hit by checking if the ad object associated with the highest bid amongst the mediation platform and the plurality of header bidding partners is already stored in the cache, and in response to the cache hit, retrieve and display a cached ad object without initiating a new ad request to the plurality of header bidding partners and the mediation platform.

19. The method of claim 12, wherein the plurality of ad networks do not submit real-time bids.

20. The method of claim 12, further comprising utilizing the plurality of ad networks as backfill to fill the ad placement through waterfall architecture upon failure to receive bids from the plurality of header bidding partners and mediation platform.

21. The method of claim 12, wherein the processor is further configured to prioritize backfill ad networks based on predefined criteria, such as historical fill rates, ad performance, or revenue potential, to optimize ad selection when the plurality of header bidding partners and mediation platform fail to provide an ad or a winning bid or an ad with a bid higher than a threshold ad bid decided by a client.

22. The method of claim 12, wherein the processor is configured to dynamically adjust positioning of backfill ad networks in waterfall architecture based on real-time data, including ad inventory availability and user engagement metrics.

23. A non-transitory computer-readable medium storing a Software Development Kit (SDK), the SDK comprising computer-executable instructions that, when executed by a processor of a mobile device, cause the processor to:
    receive an ad request from the mobile device, wherein the ad request is associated with an ad placement;

initiate parallel bid requests to:
  a mediation platform,
  a plurality of header bidding partners, and
  a plurality of ad networks;
determine in real time, a highest bid from a plurality of bids received from the plurality of header bidding partners;
simultaneously determine a prioritized list of demand sources based on bids from internal sources of the mediation platform, while the highest bid is determined from the plurality of header bidding partners;
request an ad object for the highest bid from a header bidding partner of the plurality of header bidding partners;
cache the highest bid and the ad object, wherein the cached bid and ad object are submitted in a single hop to the mediation platform;
submit the highest bid and the ad object to the mediation platform, wherein the mediation platform mediates the highest bid with other bids from the prioritized list of demand sources of the mediation platform and the plurality of ad networks; and
select, for display on the mobile device, one of:
  the ad object from the header bidding partner if the mediation platform fails to confirm a higher bid than the header bidding partner, and
  an ad object from the mediation platform if the mediation platform confirms that the mediation platform has a higher bid than the header bidding partner.

* * * * *